Figure 1:
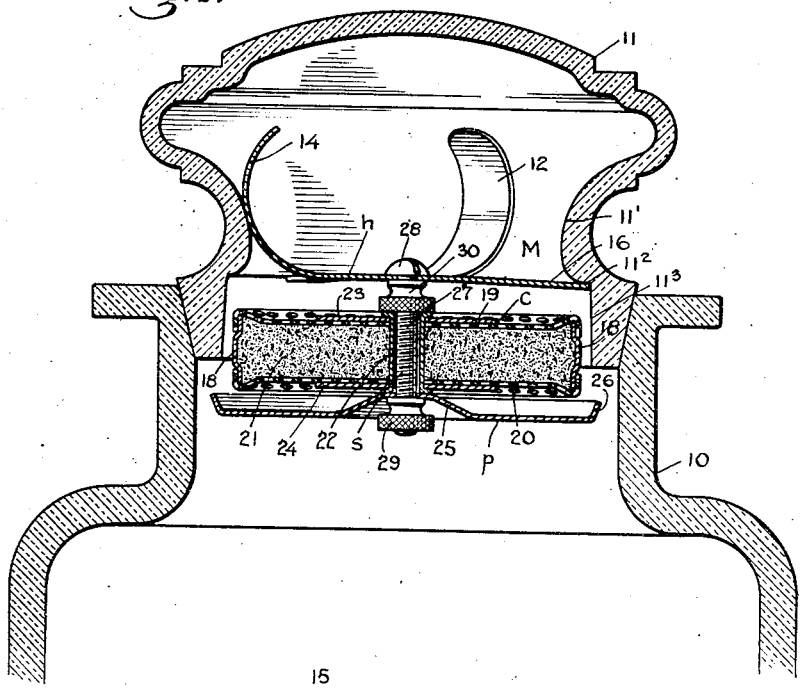

Jan. 3, 1928.

J. E. SHARP 1,655,248

MOISTURE REGULATING DEVICE

Filed Aug. 16, 1924

INVENTOR
John E. Sharp
BY *Cavanagh & James*
ATTORNEY

Patented Jan. 3, 1928.

1,655,248

UNITED STATES PATENT OFFICE.

JOHN E. SHARP, OF MILWAUKEE, WISCONSIN, ASSIGNOR TO PANAY HORIZONTAL SHOW JAR COMPANY, OF MILWAUKEE, WISCONSIN, A CORPORATION OF WISCONSIN.

MOISTURE-REGULATING DEVICE.

Application filed August 16, 1924. Serial No. 732,420.

This invention relates to a moisture regulating device for receptacles containing food products or the like, and has special reference to the provision of an improved moisture regulating device of the type disclosed in the patents to Lamar H. Shover No. 1,434,029 of Oct. 31, 1922, and No. 1,438,615 of Dec. 12, 1922.

As disclosed in the aforementioned patents, to protect the contents of food receptacles against the effects of atmospheric moisture, a moisture regulating device such as a hygroscopic or moisture absorbing substance is placed in the food receptacle out of contact with the receptacle contents and in a position where it is generally open to the circulation of air in the receptacle; and for convenience the moisture regulating means is attached to so as to be movable with the receptacle cover. The moisture regulating substance may be of any of a variety of forms, one of the well known forms being a pad or cake composed of a mixture of a fibrous substance such as paper, asbestos or the like, and a hygroscopic material such as calcium chloride or the like, the hygroscopic pad after becoming saturated or impregnated with moisture being readily dehydrated by heat for re-use.

In the type of moisture regulating means to which the present invention appertains, the hygroscopic pad is placed in a perforated container which is removably attached to a pad holder, which latter is removably received with a snap fit by a hollow cap forming the cover of the food receptacle. For rendering the most efficient service in its moisture regulating capacity, it is highly desirable that the entire body of the pad be open to a circulation of air in the receptacle and that the container for the pad body be constructed and supported in the receptacle so as to permit a free and complete air circulation through the body of the pad. The provision of an improved moisture regulating device in which these results are capable of being efficiently produced is a prime desideratum of my present invention.

During the repeated opening and closing of the food receptacle cover, and during handling of a saturated pad when the same is removed from the receptacle for dehydration, the pad being frangible is subject to the tendency of becoming chipped or broken, so that the pad is often rendered undesirable and even useless; and if in a broken or mutilated condition it is re-inserted in the food receptacle, it becomes increasingly liable to further disintegration when the receptacle cover is moved or jarred, increasing the tendency of the food particles to gravitate into for comingling with the jar contents. To obviate this objection, it is a further desideratum of my present invention to provide a moisture regulating pad the integrity of which may be maintained over long periods of use; and more specifically, to provide a pad and pad container which may be handled as a unit and which when saturated may be readily detached from the holder and baked for dehydration without fear of chipping or breaking the hygroscopic pad itself.

Figure 2:
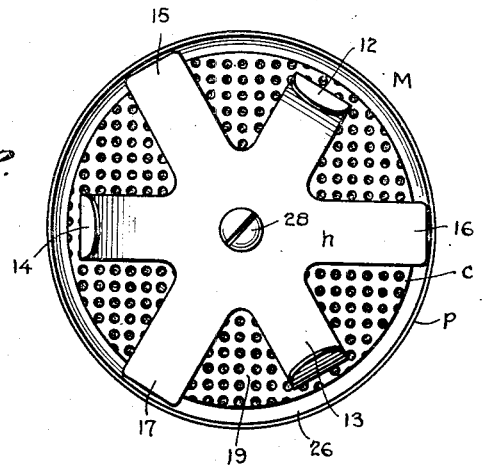
Figure 3:
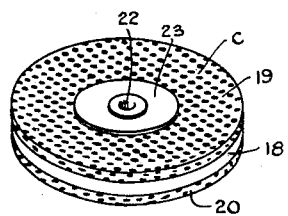

To the accomplishment of the foregoing and such other objects as will hereinafter appear, my invention consists in the elements and their relation one to the other as hereinafter particularly described and sought to be defined in the claims; reference being had to the accompanying drawings which show a preferred embodiment of my invention, and in which:

Fig. 1 is a view of my improved moisture regulating means taken in cross-section and showing the manner of its use, Fig. 2 is a top plan view of the moisture regulating device, and Fig. 3 is a perspective view showing the composite pad and container forming part of the moisture regulating device.

Referring now more in detail to the drawings, the moisture regulating device of my invention generally designated as M is designed and constructed for use with standard receptacles such as candy jars having a glass receptacle body 10 and a removable hollow glass cover or cap 11, the moisture regulating device M being designed for detachable reception by the inner walls of the receptacle cap or cover 11.

The moisture regulating means M comprises more specifically a holder $h$ which is adapted to be resiliently received with a snap fit by the interior walls of the hollow cap 11, a composite container and moisture regulating pad $c$ which is dependingly supported by the holder $h$ and spaced therefrom and a pan $p$ also dependingly supported by the holder h and arranged below the composite container and pad c so as to receive any siftings or moisture that through rough handling or neglect may have passed through the container c, the holder h, the container c and the pan p being securely held in spaced relation by means of the securing device s constructed to permit, as will become clearer hereinafter, a facile and ready detachment or removal of both the pan p and the composite container and pad c from the holder when the composite pad is desired to be removed for dehydration or replacement by the user.

The holder h is preferably made of sheet metal stamped or cut out to provide a plurality of curved resilient arms 12, 13 and 14 constructed to resiliently engage the inner wall of a constricted body portion 11' of the cap or cover, the holder further including a plurality of radial arms 15, 16 and 17 which engage a shoulder $11^2$ defined by the walls of the constricted body portion 11' of the receptacle and a stopper portion $11^3$ of the receptacle, the construction being such that the holder is received with a snap fit by the hollow cap or cover 11 in a manner to hold or support the container c spaced from the walls of the receptacle body and the receptacle cover.

The composite pad and container c is designed so as to be capable of being handled as a unit, as shown in Figs. 1 and 3 of the drawings, for attachment to and removal from the holder h, the composite container and pad comprising a container body having a side wall 18 and perforate or foraminous walls 19 and 20 enveloping a moisture regulating pad 21, which pad is made in the form of a cake containing a mixture of a hygroscopic substance such as calcium chloride and a binder such as asbestos, the casing parts being secured together by means of a central tube or ferrule 22 having its opposite ends flanged into engagement with top and bottom disks 23 and 24, and the marginal edges of the top and bottom perforate walls 19 and 20 being inturned and flanged into engagement with the side wall 18. It will be noted that the top and bottom perforate walls are dished so as to contact or engage the pad 21 to hold the same against displacement or movement in the container, the container and pad thus forming a composite unit which when handled for dehydration will prevent chipping or breaking of the pad, the integrity or identity of the latter being always maintained in use.

The pan p is made of a single sheet of metal having its central portion elevated to provide the boss 25 and its marginal edge portion upwardly turned to provde the flange 26, the pan thus forming a dish or receptacle for receiving any drippings or siftings from the container c, preventing the same from gravitating into and commingling with the contents of the jar.

The securing means s preferably comprises a screw bolt 27, the head 28 of which engages the top of the holder h, a nut 29 received by the screw bolt 27 functioning to hold all the parts in secured relation, a second nut 30 being preferably provided for spacing the container c from the holder h and from the walls of the receptacle body and cover so as to permit a free circulation of air through the perforations in the top and bottom walls of the container and through the entire body of the pad therein, the formation of the boss 25 in the pan p producing the desired spacing between the composite pad and the protecting pan.

The manner of making and using my improved moisture regulating device and its advantages will in the main be fully apparent from the above detailed description thereof. It will be further evident that while I have shown my invention in its preferred form, that many changes and modifications may be made in the structure disclosed without departing from the spirit of the invention, defined in the following claims.

I claim:

1. A device of the class described comprising a composite moisture-absorbing unit which when saturated with moisture may be handled as a unitary structure for dehyration, said unit including a container having perforated walls and a moisture-absorbing pad enveloped by the container, and means for detachably holding the unit within a hollow cap or cover, said means including radial arms adapted to bear against the interior wall of the hollow cap or cover and resilient arms adapted to be detachably received with snap fit by the hollow cap or cover.

2. The combination with a hollow receptacle cover having a constricted body portion and a stopper portion, the walls of said portions providing a shoulder, of a moisture regulating means removably carried by the cover, said moisture regulating means comprising a holder having a plurality of resilient arms adapted to be detachably received by said constricted body portion and having a plurality of radial arms adapted to abut against said shoulder, and a container removably carried by the holder, said container having a side wall and perforated top and bottom walls enveloping a moisture regulating substance, the said container being spaced from the said holder and from the inner walls of the cover to permit a circulation of air through the top and bottom perforate walls thereof.

3. A device of the class described comprising a holder having a plurality of curved resilient arms and a plurality of radial arms, a container enveloping a moisture regulating pad spaced below the holder, the container and pad forming a composite unit, a pan spaced below the container and a bolt securing the holder, container and pan together in mutually spaced relation.

4. A device of the class described comprising a container including dished perforated top and bottom walls, and an end wall, a moisture-absorbing pad within the container and held against movement by the dished walls, a sleeve passing through said container and having flanged ends bearing against the perforated walls, a stud member passing through said sleeve and a holder carried by said stud member and including radial arms and resilient curved arms, said holder being adapted to detachably support the pad-holder with its pad within the interior of a hollow cap or cover.

Signed at Milwaukee, in the county of Milwaukee, and State of Wisconsin, this 9th day of August A. D. 1924.

JOHN E. SHARP.